(12) United States Patent
Oshima (10) Patent No.: US 8,654,411 B2
(45) Date of Patent: Feb. 18, 2014

(54) IMAGE SCANNING DEVICE, IMAGE SCANNING METHOD, IMAGE DISPLAY CONTROLLING DEVICE, IMAGE DISPLAY CONTROLLING METHOD, IMAGE PROCESSING SYSTEM, AND COMPUTER PROGRAM

(75) Inventor: Osamu Oshima, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 630 days.

(21) Appl. No.: 12/876,932

(22) Filed: Sep. 7, 2010

(65) Prior Publication Data
US 2011/0058231 A1    Mar. 10, 2011

(30) Foreign Application Priority Data
Sep. 7, 2009    (JP) ................ 2009-206173

(51) Int. Cl.
*H04N 1/04* (2006.01)
*H04N 1/00* (2006.01)
*H04N 1/40* (2006.01)
*G06F 3/12* (2006.01)

(52) U.S. Cl.
USPC ............ 358/474; 358/1.6; 358/470; 358/1.13

(58) Field of Classification Search
None
See application file for complete search history.

(56) References Cited

U.S. PATENT DOCUMENTS

| 7,268,909 B2 | 9/2007 | Nakagiri | 358/1.16 |
| 2005/0134871 A1* | 6/2005 | Nakagiri | 358/1.6 |
| 2007/0195378 A1* | 8/2007 | Yoshida | 358/470 |
| 2009/0244586 A1* | 10/2009 | Sei | 358/1.13 |

FOREIGN PATENT DOCUMENTS

| JP | 10-229484 | 8/1998 |
| JP | 2001-341363 | 12/2001 |
| JP | 2005-142770 | 6/2005 |
| JP | 2006-180343 | 7/2006 |

* cited by examiner

*Primary Examiner* — Firmin Backer
*Assistant Examiner* — Henok A Shiferaw
(74) *Attorney, Agent, or Firm* — DLA Piper LLP (US)

(57) ABSTRACT

An image scanning device accepts an instruction to scan a double-sided document and scans a plurality of double-sided documents with respect to each page to produce image data. Image data is eliminated when a page is determined as being solid colored from the image data produced by the scanning section. Image data other than the eliminated image data is transmitted to the outside. When an instruction to scan a double-sided document is received from the outside and accepted, elimination of image data is prohibited.

16 Claims, 7 Drawing Sheets

IMAGE SCANNING DEVICE, IMAGE SCANNING METHOD, IMAGE DISPLAY CONTROLLING DEVICE, IMAGE DISPLAY CONTROLLING METHOD, IMAGE PROCESSING SYSTEM, AND COMPUTER PROGRAM

CROSS-REFERENCE TO RELATED APPLICATIONS

This application claims priority under 35 U.S.C. 119 to Japanese Patent Application No. 2009-206173, field on Sep. 7, 2009, which application is hereby incorporated by reference in its entirety.

BACKGROUND OF THE INVENTION

1. Field of the Invention

The present invention relates to an image scanning device and method for scanning document images to produce image data, an image display controlling device and method for acquiring image data to control display of an image, an image processing system including the image scanning and image display controlling devices, and computer programs for realizing the image scanning and image display controlling devices.

2. Description of the Related Art

Office automation (OA) equipment, which scans a document image with an image sensor such as a charge coupled device (CCD) to perform processing on the acquired image data, is often present in offices. This OA equipment may be, for example, a copier, a facsimile, a scanner, a digital multi-function peripheral, or the like. For example, a copier forms an image based upon scanned image data on printing paper. A facsimile transmits scanned image data to another facsimile communication equipment. A scanner stores scanned image data in a storing device of its own, and transmits the image data to another device such as a personal computer (PC). A digital multifunction peripheral is equipped with the functions of these plurality of pieces of OA equipment.

In a case of scanning document images of a plurality of documents in such OA equipment, when a double-sided document and a document with one side being a blank page are mixed among the documents, it is desirable that image data corresponding to the blank page can be eliminated (hereinafter referred to as blank-page elimination) before storing image data obtained by scanning the document images into a memory and before forming images based upon the image data on printing paper.

An image scanning device is known in which whether or not a document is a blank page is determined based upon image data obtained by scanning document images. The document is subjected to blank-page elimination when determined as being a blank page. An image input/output device further known in which a result of determining whether or not an inputted image (herein, the same as image data) is a blank page is once stored as an attribute of the image along with image data, and image data having an attribute of a blank page is eliminated (blank-page elimination), to output image data without the attribute of the blank page.

On the other hand, for example, in the case of displaying a double-sided document in a device for obtaining image data produced by the foregoing image scanning device and in a device for inputting image data outputted from the foregoing image input/output device, it is desirable not to eliminate a blank page regarding the acquired and inputted image data in order to display the blank page blank as it is.

SUMMARY OF THE INVENTION

There has been a problem with the foregoing image scanning and image input/output devices in that blank-page elimination cannot be made invalid from another device. For example in a technology without an interesting name (TWAIN) (registered trademark) as a standard application programming interface (API) specification, although whether or not to scan both sides of a document can be instructed from one device to another device, an interface for instructing on/off of blank-page elimination is not supported.

In order to overcome these problems, the present invention provides an image scanning device and method that can instruct on/off of blank-page elimination from the outside when scanning document images of double-sided documents. The present invention also provides an image display controlling device and method that can insert an image of a page subjected to blank-page elimination when acquiring image data obtained by scanning document images of double-sided documents. The present invention further provides an image processing system including the image scanning and image display controlling devices. The present invention further provides computer programs for realizing the image scanning and image display controlling devices.

The problem to be solved by the present invention is as described above, and means for solving this problem and an effect thereof are described below.

An image scanning device according to the present invention includes an accepting section that accepts an instruction to scan a double-sided document. A scanning section scans a plurality of double-sided documents with respect to each page to produce image data when the accepting section accepts the scanning instruction. A determining section determines whether or not each page of the documents is solid colored based upon the image data produced by the scanning section. An eliminating section eliminates image data in accordance with a page determined by the determining section as being solid colored from the image data produced by the scanning section. A transmitting section transmits, to the outside, image data other than the image data eliminated by the eliminating section among the image data produced by the scanning section. A receiving section receives from the outside an instruction to scan a double-sided document. An accepting section accepts the scanning instruction received by the receiving section. An eliminating section is prohibited from eliminating image data when the accepting section accepts the scanning instruction received by the receiving section.

In the image scanning device according to the present invention, the receiving section receives, from the outside, information indicating whether or not front-side images and back-side images based upon image data should be alternately switched and displayed outside. Further, the eliminating section is prohibited from eliminating image data when the information received by the receiving section indicates that the switching-display should be performed in the case of the accepting section accepting the scanning instruction received by the receiving section.

An image scanning method according to the present invention accepts an instruction to scan a double-sided document, and scans a plurality of double-sided documents with respect to each page to produce image data. Whether or not each page of the documents is solid colored is determined based upon the produced image data, and image data determined as being solid colored is eliminated from the produced image data. Image data other than the eliminated image data among the produced image data is transmitted to the outside. When an instruction to scan a double-sided document is received from the outside and accepted, elimination of image data is prohibited.

A computer program recorded on a non-transitory record medium according to the present invention makes a computer, to which image data produced by scanning a plurality of double-sided documents with respect to each page is transmitted, control transmission of image data in accordance with a section having acquired an instruction to scan a double-sided document. In a determining step, the computer is made to determine whether or not each page of a plurality of double-sided documents is solid colored based upon image data produced by scanning the document with respect to each page. In an eliminating step, the computer is made to eliminate image data in accordance with a page determined as being solid colored from the produced image data. In a transmitting step, the computer is made to transmit, to the computer, image data other than the eliminated image data among the produced image data. In a receiving step, the computer is made to receive an instruction to scan a double-sided document from the outside. In an accepting step, the computer is made to accept the received scanning instruction. In a prohibiting step, the computer is made to prohibit elimination of image data in the case of accepting the received scanning instruction.

An image processing system according to the present invention includes an image scanning device and an image display controlling device. The image scanning device has an accepting section, a scanning section, a determining section, an eliminating section, a first transmitting section, and a first receiving section. The accepting section accepts an instruction to scan a double-sided document. The scanning section scans document images of a plurality of double-sided documents with respect to each page to produce image data provided with page numbers when the accepting section accepts the scanning instruction. The determining section determines whether or not each page of the documents is solid colored based upon the image data produced by the scanning section. The eliminating section eliminates image data in accordance with a page determined by the determining section as being solid colored from the image data produced by the scanning section. The first transmitting section transmits, to the outside, image data other than the image data eliminated by the eliminating section among the image data produced by the scanning section. The first receiving section receives from the outside an instruction to scan a double-sided document. The accepting section accepts the scanning instruction received by the receiving section. The eliminating section is prohibited from eliminating image data when the accepting section accepts the scanning instruction received by the receiving section. The image display controlling device has a second transmitting section, a second receiving section, and a display controlling section. The second transmitting section transmits the scanning instruction. The second receiving section receives image data obtained by scanning document images of a plurality of double-sided documents with respect to each page and providing page numbers. The display controlling section switches and displays front-side images and back-side images based upon the received image data alternately in page-numerical order.

An image display controlling device according to the present invention includes a receiving section that receives image data obtained by scanning document images of a plurality of double-sided documents and providing page numbers. A missing page detecting section detects a page number missing from page numbers to be sequentially provided to the received image data. An inserting section inserts a solid-colored image into the received image data correspondingly to the detected page number. A display controlling section switches and displays front-side images and back-side images based upon the image data with the solid-colored image inserted therein, alternately in page-numerical order on a screen.

The image display controlling device according to the present invention includes a background detecting section for detecting a background of the document based upon the received image data. The inserting section inserts image data for one page of the same color as the background detected by the background detecting section regarding the document that contains a page having the page number detected by the missing page detecting section.

An image display controlling method according to the present invention receives image data obtained by scanning document images of a plurality of double-sided documents and providing page numbers. A page number, missing from page numbers to be sequentially provided to the received image data, is detected. A solid-colored image is inserted into the received image data correspondingly to the detected page number. Front-side images and back-side images based upon the image data with the solid-colored image inserted therein, are alternately switched and displayed in page-numerical order on a screen.

A computer program recorded on a non-transitory record medium according to the present invention makes a computer, which acquires image data to display an image based upon the image data, control display of an image based upon image data obtained by scanning document images of a plurality of double-sided documents and providing page numbers. In a detecting step, the computer is made to detect a page number, missing from page numbers to be sequentially provided to the obtained image data. In an inserting step, the computer is made to insert solid-colored image data for one page into the obtained image data correspondingly to the detected page number. In a switching display step, the computer is made to switch and display front-side images and back-side images based upon the image data with the solid-colored image inserted therein, alternately in page-numerical order on a screen.

An image processing system according to the present invention includes an image scanning device and an image display controlling device. The image scanning device includes a scanning section, a determining section, an eliminating section, and a transmitting section. The scanning section scans document images of a plurality of double-sided documents to produce image data provided with page numbers. The determining section determines whether or not a page containing an image based upon the image data produced by the scanning section is solid colored. The eliminating section eliminates image data in accordance with a page determined by the determining section as being solid colored from the image data produced by the scanning section. The transmitting section transmits, to the outside, image data other than the image data eliminated by the eliminating section among the image data produced by the scanning section. The image display controlling device has a receiving section, a missing page detecting section, an inserting section, and a display controlling section. The receiving section receives image data obtained by scanning document images of a plurality of double-sided documents and providing page numbers. The missing page detecting section detects a page number missing from page numbers to be sequentially provided to the received image data. The inserting section inserts solid-colored image data for one page into the received image data correspondingly to the detected page number. The display controlling section switches and displays front-side images and back-side images based upon the image data with the solid-colored image inserted therein, alternately in page-numerical order on a screen.

In the present invention, when an instruction to scan a double-sided document is accepted, a plurality of double-sided documents are scanned with respect to each page to produce image data. Next, it is determined whether or not each page of the documents is solid colored based upon the produced image data. Subsequently, image data in accordance with a page determined as being solid colored is eliminated, and the produced image data other than the eliminated image data is transmitted to the outside. Then, the image scanning device receives from the outside an instruction to scan a double-sided document, and accepts the received scanning instruction. When the received scanning instruction is accepted, elimination of image data is prohibited. Thereby, in the case of scanning a double-sided document, even when blank-page elimination is to be performed from a standard point of view, blank-page elimination is not performed on image data produced by scanning the double-sided document at the time of receiving from the outside an instruction to scan a double-sided document.

In the present invention, information indicating whether or not front-side and back-side images based upon image data should be alternately switched and displayed outside is received from the outside. Elimination of image data is prohibited when the received information indicates that the switching-display should be performed in the case of accepting the instruction to scan a double-sided document received from the outside. Thereby, in the case of scanning a plurality of double-sided documents with respect to each page with reception of the instruction to scan a double-sided document from the outside, blank-page elimination is not performed only when it is indicated that front-side and back-side images based upon image data should be alternately switched and displayed outside.

In the present invention, the image scanning device scans a plurality of sheets of the double-sided document with respect to each page to produce image data provided with page numbers in the case of accepting the instruction to scan the double-sided document. Next, the image scanning device determines whether or not each page of the documents is solid colored based upon the produced image data. Subsequently, the image scanning device eliminates image data in accordance with a page determined as being solid colored from the produced image data, and transmits the produced image data other than the eliminated image data, to the outside. Then, the image scanning device receives from the outside an instruction to scan a double-sided document, and accepts the received scanning instruction. The image scanning device prohibits elimination of image data when accepting the received scanning instruction. Further, after transmitting the scanning instruction, the image display controlling device switches and displays front-side and back-side images based upon received image data alternately in page-numerical order when receiving image data obtained by scanning document images of a plurality of double-sided documents with respect to each page and providing page numbers. Thereby, in the image scanning device, document images of double-sided documents are scanned, without being subjected to blank-page elimination, and image data provided with page numbers is given to the image display controlling device. Subsequently in the image display controlling device, both front-side and back-side images containing a blank page are alternately switched and displayed in page-numerical order based upon the acquired image data, regardless of the order of acquiring the image data.

In the present invention, image data, obtained by scanning document images of a plurality of double-sided documents and providing page numbers, is received. Next, a page number, missing from page numbers to be sequentially provided to the received image data, is detected. Subsequently, a solid-colored image is inserted into the received image data correspondingly to the detected page number, and front-side and back-side images based upon the image data with the solid-colored image inserted therein, are alternately switched and displayed in page-numerical order on a screen. Thereby, when image data obtained by scanning document images of double-sided documents is acquired and a page subjected to the blank-page elimination is detected, a solid-colored image corresponding to the detected blank page is inserted into the acquired image data.

In the present invention, a background regarding a document that contains a page having a page number missing from image data is detected, and image data for one page of the same color as the detected background is inserted into the received image data. Thereby, when front-side and back-side images based upon the acquired image data are alternately switched and displayed, the front and back sides of the switched and displayed image have the same colored background.

In the present invention, the image scanning device scans document images of a plurality of double-sided documents to produce image data provided with page numbers. Next, the image scanning device determines whether or not a page containing an image based upon the produced image data is solid colored. Subsequently, the image scanning device eliminates image data in accordance with a page determined as being solid colored from the produced image data and transmits, to the outside, the produced image data other than the eliminated image data. Further, the image display controlling device receives image data obtained by scanning document images of a plurality of double-sided documents and providing page numbers. Next, the image display controlling device detects a page number missing from page numbers to be sequentially provided to the received image data. Subsequently, the image display controlling device inserts a solid-colored image into the received image data correspondingly to the detected page number. Thereby, in the image scanning device, document images of double-sided documents are scanned, while being subjected to blank-page elimination, and image data provided with page numbers is given to the image display controlling device. Subsequently in the image display controlling device, when a page subjected to the blank-page elimination is detected among the acquired image data, a solid-colored image corresponding to the detected blank page is inserted into the acquired image data. Thereby, when it is set that front-side and back-side images based upon the image data processed by the image scanning device are alternately switched and displayed, images of the front and back sides of the double-sided document are displayed without a missing portion.

According to the present invention, when an instruction to scan a double-sided document is accepted, it is determined whether or not each page of the documents is solid colored based upon image data obtained by scanning a plurality of double-sided documents with respect to each page, and image data in accordance with a page determined as being solid colored is eliminated. When the instruction to scan a double-sided document is received from the outside and accepted, elimination of image data is prohibited. Thereby, in the case of scanning a double-sided document, even when blank-page elimination is to be performed from a standard point of view, blank-page elimination is not performed on image data produced by scanning the double-sided document upon receiving from the outside an instruction to scan a double-sided document. Therefore, in the case of scanning document images of double-sided documents, it is possible to instruct on/off of blank-page elimination from the outside.

Further, when image data, obtained by scanning document images of a plurality of double-sided documents and providing page numbers, is received, a solid-colored image corresponding to a page number detected as being missing is inserted into the received image data. Thereby, when image data obtained by scanning document images of double-sided documents is acquired and a page subjected to the blank-page elimination is detected, a solid-colored image corresponding to the detected blank page is inserted into the acquired image data. Therefore, in the case of acquiring image data obtained by scanning document images of double-sided documents, it is possible to insert an image of a page subjected to blank-page elimination.

Other features, elements, processes, steps, characteristics and advantages of the present invention will become more apparent from the following detailed description of embodiments of the present invention with reference to the attached drawings.

DETAILED DESCRIPTION OF PREFERRED EMBODIMENTS

Embodiments are now described in which an image scanning device and an image display controlling device of an image processing system according to the present invention are respectively applied to a scanner and a PC (personal computer).

First Embodiment

Figure 1:
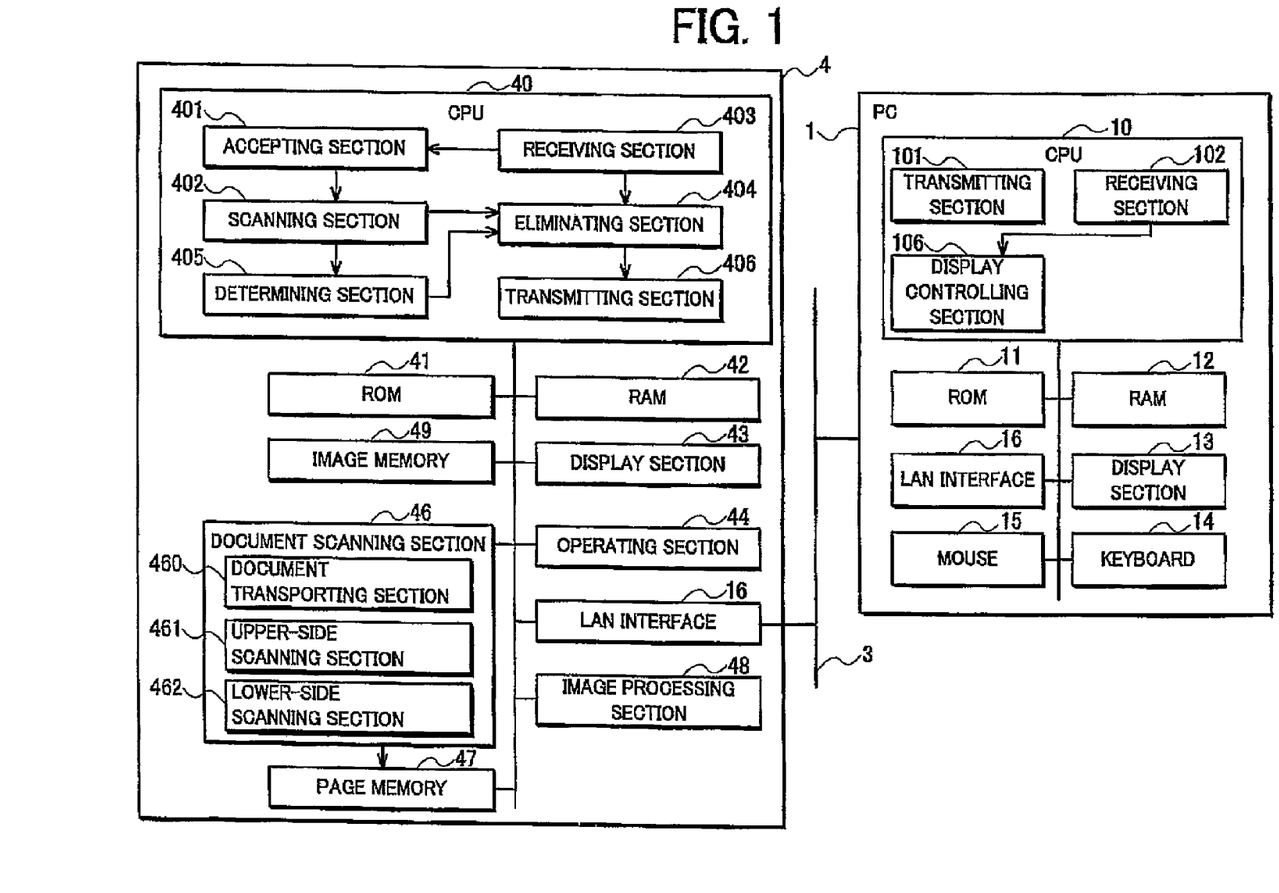
FIG. 1 is a block diagram illustrating a configuration of a network scanner system equipped with a scanner and a PC according to a first embodiment of the present invention.

FIG. 1 is a block diagram of a network scanner system equipped with a scanner and a PC according to a first embodiment of the present invention. The network scanner system according to the first embodiment is made up of a scanner (image scanning device) 4, and a PC 1 connected to the scanner 4 through a local area network (LAN) 3.

The PC 1 includes a CPU 10 as a control center. The CPU 10 is bus-connected with a read only memory (ROM) 11 and a random access memory (RAM) 12. The ROM 11 stores information such as a program. The RAM 12 stores temporarily generated information. The CPU 10 executes input/output processing, or processing such as computing, in accordance with a control program previously stored in the ROM 11. The PC 1 further includes a display section 13, a keyboard 14, a mouse 15, and a LAN interface 16. The display section 13 includes an LCD that displays a variety of information, contents of settings and the like on a screen. The keyboard 14 and the mouse 15 accept operations for a variety of settings, instructions, selections and the like. The LAN interface 16 connects to the LAN 3. The display section 13, keyboard 14, mouse 15, and LAN interface 16 are bus-connected to one another. The LAN 3 may be a wireless LAN circuit, as well as a standard wired LAN circuit. Further, a communication circuit other than a LAN can also be used.

Each functional block of the CPU 10 is realized by software. A transmitting section 101 transmits a variety of instructions to the scanner 4 through the LAN interface 16 and the LAN 3 (hereinafter simply referred to as "through the LAN 3"). A receiving section 102 receives and acquires image data from the scanner 4 through the LAN 3, and gives the acquired image data to a display controlling section 106. Based upon the image data given from the receiving section 102, the display controlling section 106 produces a plurality of sets of front-side and back-side images that are reduced in image size from the document image. Further, the display controlling section 106 displays each set of both images produced in page-numerical order inside a plurality of display areas previously set on a screen.

The scanner 4 includes a CPU 40 as a control center. The CPU 40 is bus-connected with a ROM 41 and a RAM 42. The ROM 41 stores information such as a program. The RAM 42 stores temporarily generated information. The CPU 40 executes input/output processing, or processing such as computing, in accordance with a control program previously stored in the ROM 41. The scanner 4 further includes a display section 43, an operating section 44, and a LAN interface 16. The display section 43 includes an LCD that displays a variety of information, contents of settings and an image on a screen. The operating section 44 has a key that accepts operations for a variety of settings, instructions, selections and the like. The LAN interface 16 connects to the LAN 3. The display section 43, the operating section 44, and the LAN interface 16 are bus-connected to one another.

The scanner 4 further includes a document scanning section 46 and a page memory 47. The document scanning section 46 scans a document image of a double-sided document to produce image data. The page memory 47 temporarily stores the image data, produced by the document scanning section 46, with respect to each page. The image data stored in the page memory 47 is subjected to image processing by an image processing section 48, and stored in an image memory 49 as a series of image data. The document scanning section 46 has a document transporting section 460, an upper-side scanning section 461 and a lower-side scanning section 462. The document transporting section 460 carries, one-by-one, a plurality of double-sided documents placed in a document tray to a predetermined scanning portion. The upper-side scanning section 461 scans the upper side (front side) of the document carried to the scanning portion. The lower-side scanning section 462 scans the lower side (back side) of the document. The upper-side scanning section 461 and the lower-side scanning section 462 each have one (a set of) image sensor(s). The upper and lower sides of the document may be scanned using the one (set of) image sensor(s) in one scanning section.

The image processing section 48 performs processing of correcting a variety of distortions generated in image data in an illumination system, an optical system and an imaging-pick up device of the document scanning section 46.

Each functional block of the CPU 40 is realized by software. When receiving an instruction to scan a double-sided document or to cancel blank-page elimination from the PC through the LAN 3, a receiving section 403 gives that instruction to an eliminating section 404. Further, when receiving the instruction to scan a double-sided document from the PC 1 through the LAN 3, the receiving section 403 gives that instruction to an accepting section 401. The accepting section 401 accepts from the operating section 44 the instruction to scan a double-sided document, given from an application program (hereinafter referred to as application) executed by the CPU 40 or from the receiving section 403, and gives that instruction to a scanning section 402.

When receiving from the accepting section 401 the accepted instruction to scan a double-sided document, the scanning section 402 makes the document scanning section 46 start scanning, makes the image processing section 48 perform processing on image data on each page stored into the page memory 47, and makes the image memory 49 store a series of image data. Thereby, the scanning section 402 gives the scanned image data to a determining section 405 and the eliminating section 404. The determining section 405 determines whether or not each page of the documents is solid colored based upon the image data given from the scanning section 402, and gives the eliminating section 404 information specifying a page determined as being solid colored.

The eliminating section 404 eliminates image data in accordance with a page specified by information given from the determining section 405, from the image data given from the scanning section 402, and gives the obtained data to a transmitting section 406. However, when being given from the receiving section 403 the received instruction to scan a double-sided document or instruction to cancel blank-page elimination, the eliminating section 404 does not eliminate the image data. The transmitting section 406 transmits the image data given from the eliminating section 404 to the PC 1 through the LAN 3.

In the foregoing configuration, for example, when the instruction to scan a double-sided document given from the operating section 44 is accepted or when the instruction to scan a double-sided document transmitted from the PC 1 is received after placement of a plurality of double-sided documents in the document tray, not illustrated, of the scanner 4, the scanner 4 scans a front-side and a back-side of each double-sided document to produce image data. A variety of distortions are corrected in the produced image data, and the data is coded and stored in the image memory 49. In this case, the respective front-sides and back-sides of the scanned documents are provided with page numbers in succession as serial page numbers. The image data constituting the document image is blocked with respect to each page, and a header of each page is added with a page number. Further, an attribute indicating that the scanned documents are double-sided documents is added to the entire image data.

Whenever image data for one page is stored in the image memory 49, the scanner 4 eliminates a blank page from the image data as required, and when image data for all pages is stored in the image memory 49, the stored image data is transmitted to the PC 1 through the LAN 3. The image data received by the PC 1 is stored in an image memory held on the RAM 12. The image data subjected to blank-page elimination and stored in the image memory 49 may be transmitted to the PC 1, for example, whenever image data for one page is stored. Further, at the time of blank-page elimination, a page number of the eliminated page is taken as an unused number. Subsequently, when the image data for all pages is received and stored into the image memory (RAM 12), the PC 1 produces a plurality of sets of front-side and back-side images reduced in image size from the document images, and displays each set of images produced on the LCD of the display section 13 in page-numerical order.

Figure 2:
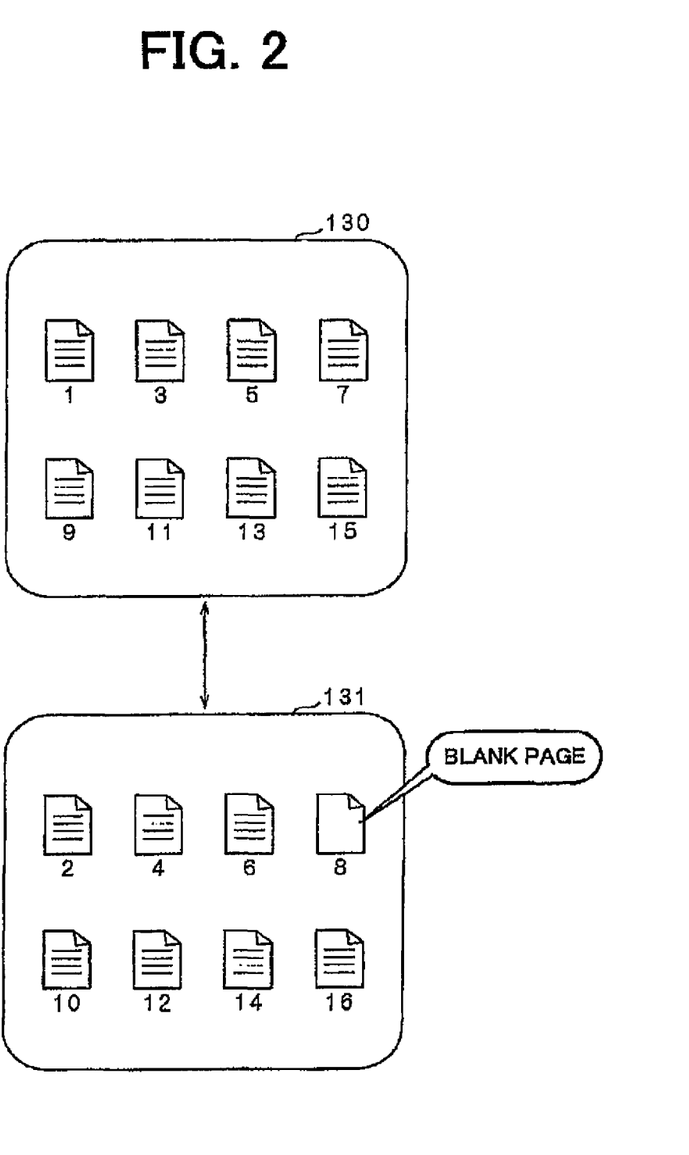
FIG. 2 is an explanatory view illustrating an example of alternately switching and displaying front-side images and back-side images of a plurality of documents in page-numerical order on a liquid crystal display (LCD) screen of a display section.

FIG. 2 illustrates an example of alternately switching and displaying front-side and back-side images of a plurality of documents in page-numerical order on screens 130, 131 on an LCD of the display section 13. In eight display areas arranged at upper and lower stages of the screen 130, the front-side image of each document having an odd page number is displayed in numerically ascending order for a fixed period of time. Further, in eight display areas of the screen 131, the back-side image of each document having an even page number is displayed in numerically ascending order for a fixed period of time. Such switching of displays as thus described is repeated. Accordingly, the front-side image and the back-side image of each document is switched and displayed in each of the specific display areas of screens 130, 131 in an easily viewable manner for a fixed period of time. For example, even when the back-side of the fourth document, namely a page with a page number 8 is a blank page, image data received by the PC 1 from the scanner 4 contains data of a blank page, and a blank page is correctly displayed as a back-side page of a page number 7.

Operations performed by the scanner 4 and the PC 1 according to the first embodiment of the present invention are now described with reference to FIGS. 3A and 3B, which are flowcharts illustrating procedures for the CPUs 40, 10 in the case of the PC 1 displaying an image based upon image data obtained by scanning double-sided documents by the scanner 4. The following processing are respectively executed by the CPU 40 of the scanner 4 and the CPU 10 of the PC 1 in accordance with control programs previously stored in the ROM 41 of the scanner 4 and the ROM 11 of the PC 1. The CPU 40 of the scanner 4 starts the following processing when double-sided documents are placed in the document tray and preparation for scanning is thus completed. The CPU 10 of the PC 1 starts the following processing when becoming able to accept an instruction in accordance with scanning of a document given from an application program. In the first embodiment, a blank-page elimination flag is stored in the RAM 42. Further, hereinafter, image data received by the PC 1 and image data produced for display are stored in the RAM 12.

Figure 3A:
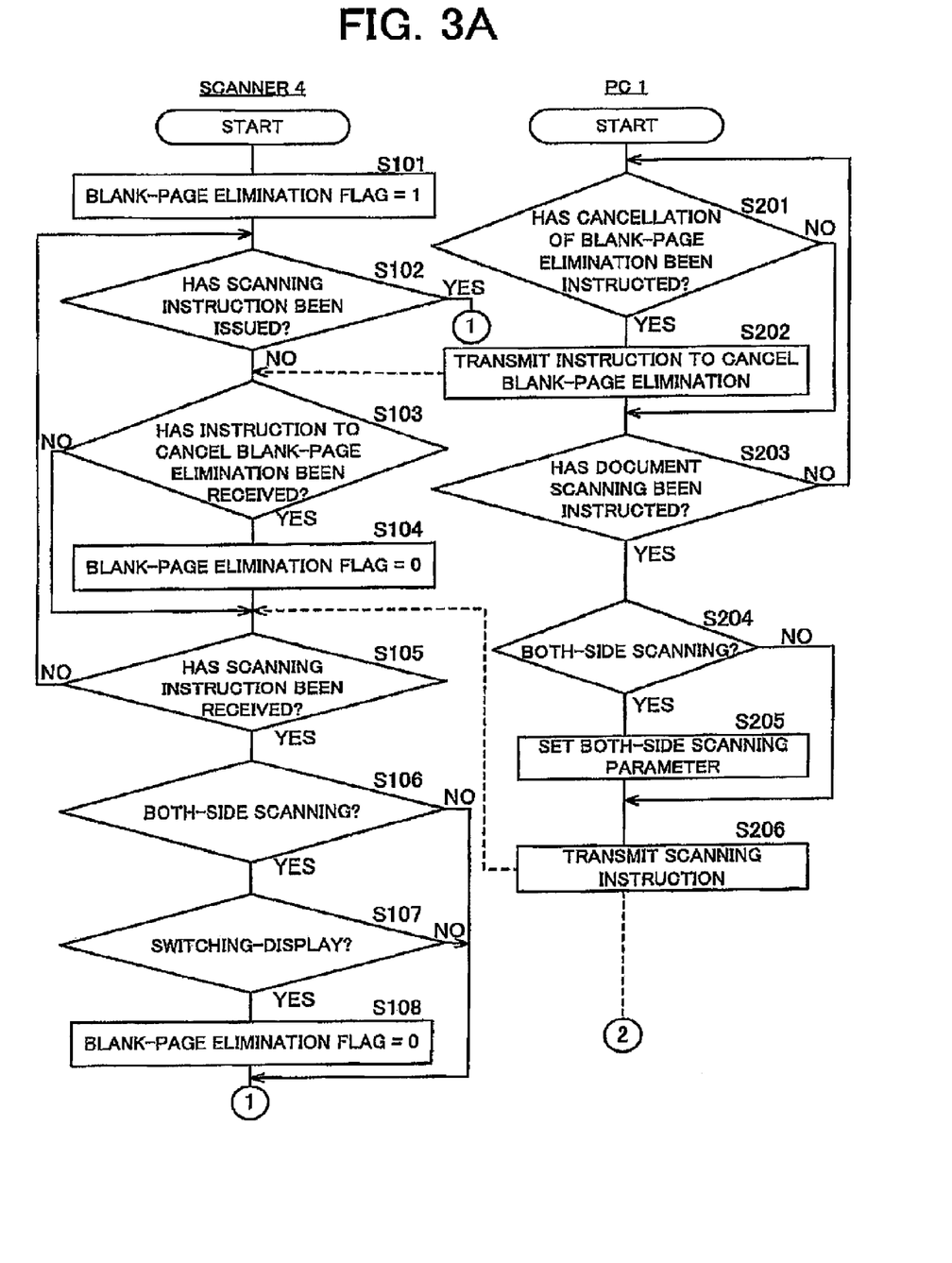
FIG. 3A is a flowchart illustrating a procedure for a central processing unit (CPU) in the case of the PC displaying images based upon image data obtained by the scanner scanning double-sided documents.
Figure 3B:
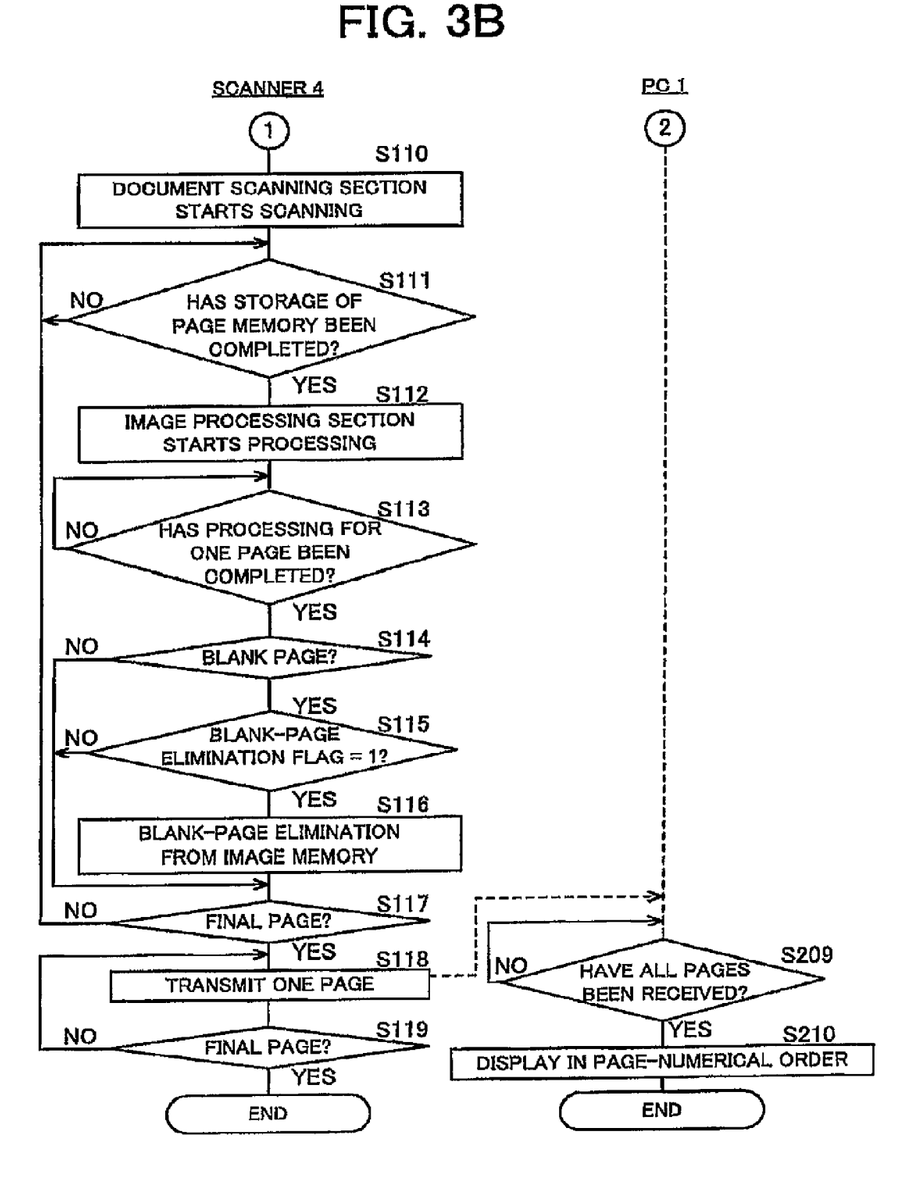
FIG. 3B is a flowchart illustrating the procedure for the CPU in the case of the PC displaying images based upon the image data obtained by the scanner scanning the double-sided documents.

When the processing of FIG. 3A is started, the CPU 40 of the scanner 4 sets a blank-page elimination flag to "1" as part of initialization (S101), and determines whether or not the instruction to scan a double-sided document that is given from the operating section 44 or the application program has been issued (S102). When the instruction has been issued (S102: YES), the CPU 40 shifts the processing to step S110. When the scanning instruction has not been issued (S102:

NO), the CPU 40 determines whether or not the instruction to cancel blank-page elimination has been received from the PC 1 (S103). When the instruction to cancel blank-page elimination has been received (S103: YES), the CPU 40 clears the blank-page elimination flag to "0".

When completing the processing of step S104 or when the instruction to cancel blank-page elimination is not received in step S103 (S103: NO), the CPU 40 determines whether or not a scanning instruction in accordance with both-side scanning or single-side scanning has been received from the PC 1 (S105). When the scanning instruction has not been received (S105: NO), the CPU 40 returns the processing to step S102. In this manner, the CPU 40 of the scanner 4 repeatedly executes the processing from steps S102 to S105 until receiving the scanning instruction from the operating section 44 or the application program, or receiving the instruction to cancel blank-page elimination or the scanning instruction from the PC 1.

Meanwhile, the CPU 10 of the PC 1 determines whether or not the instruction to cancel blank-page elimination has been given from the application program (S201). When the instruction has been given (S201: YES), the CPU 10 transmits the instruction to cancel blank-page elimination to the scanner 4 (S202). When completing the processing of S202 or when the instruction to cancel blank-page elimination has not been given (S201: NO), the CPU 10 determines whether or not the instruction to scan a document has been given from the application program (S203). When the instruction has not been given (S203: NO), the CPU 10 returns the processing to step S201.

When the instruction to scan a document has been given from the application program (S203: YES), the CPU 10 determines whether or not the scanning instruction is an instruction in accordance with both-side scanning (S204). When the instruction is one in accordance with both-side scanning (S204: YES), the CPU 10 sets a parameter for both-side scanning to be transmitted to the scanner 4 (S205). In this case, a parameter (information), indicating whether or not front-side and back-side images are alternately switched and displayed, is set in combination by means of the application program. When completing processing of step S205 or when the instruction is not one in accordance with both-side scanning (S204: NO), the CPU 10 transmits the scanning instruction in accordance with both-side or single-side scanning to the scanner 4 along with the parameter (S206), and shifts the processing to step S209.

Returning to processing of the scanner 4, when the scanning instruction has been received from the PC 1 (S105: YES), the CPU 40 determines whether or not the parameter for both-side scanning is present in the received parameters (S106). When the parameter is present (S106: YES), the CPU 40 determines whether or not a parameter indicating alternate switching-display of front-side and back-side images is present (S107). When the parameter is present (S107: YES), the CPU 40 clears blank-page elimination flag to "0". In the case of both-side scanning, when front-side and back-side images are in principle switched and displayed alternately in the PC 1, the parameter indicating whether or not the switching-display is performed may not be set in step S205 so that the processing of step S107 of the scanner 4 may not be executed (the processing may be skipped). When completing the processing of step S108 or when the parameter is not present (S106, S107: NO), the CPU 40 makes the document scanning section 46 start scanning of documents (S110).

Thereafter, the CPU 40 determines whether or not the page memory 47 has completed storing data for one page (S111). When the storing has not been completed (S111: NO), the CPU 40 stands by until the page memory 47 completes the storing. When the page memory 47 has completed the storing (S111: YES), the CPU 40 makes the image processing section 48 start performing predetermined image processing (S112). The CPU 40 then determines whether or not the image processing section 48 has completed image processing on data for one page (S113). When the processing has not been completed (S113: NO), the CPU 40 stands by until the image processing section 48 completes the image processing.

When the image processing section has completed the image processing (S113: YES), the CPU 40 determines whether or not a page on which the image processing has been completed is a blank page (S114). When the page is a blank page (S114: YES), the CPU 40 determines whether or not the blank-page elimination flag has been set to "1" (S115: YES). When the setting has been made (S115: YES), the CPU 40 eliminates (blank-page elimination) image data of the page determined as being a blank page from the image memory 49 (S116). In this case, a page number of the page subjected to blank-page elimination is taken as an unused number.

When completing the processing of step S116, when the page is not a blank page (S114; NO) or when the blank-page elimination flag has not been set to "1" (S115: NO), the CPU determines whether or not the page on which the image processing has been completed is a final page (S117). When the page is not a final page (S117: NO), namely when determining that image data for all pages has not been stored in the image memory 49, the CPU 40 returns the processing to step S111.

When the page on which the image processing has been completed is a final page (S117: YES), the CPU 40 transmits image data for one page from the image memory 49 (S118), and determines whether or not the transmitted page is a final page (S119). When the page is not a final page (S119: NO), the CPU 40 returns the processing to step S118. When the page is a final page (S119: YES), the CPU 40 completes the processing.

Returning to the processing of the PC 1, the CPU 10 of the PC 1 stands by until receiving image data for all pages from the scanner 4 (S209: NO), and when the image data for all pages has been received (S209: YES), as illustrated in FIG. 2, the CPU 10 alternately switches and displays front-side and back-side images of each document based upon the received image data in page-numerical order (S210), to complete the processing.

As thus described, according to the first embodiment, when accepting the instruction to scan a double-sided document, the scanner scans a plurality of double-sided documents with respect to each page to produce image data. Next, the scanner determines whether or not each page of the documents is a blank page (solid colored) based upon the produced image data. The scanner then eliminates image data in accordance with a page determined as being a blank page, and transmits the produced image data other than the eliminated image data to the PC. When receiving and accepting the instruction to scan a double-sided document or the instruction to cancel blank-page elimination transmitted from the PC, the scanner in principle prohibits elimination of image data. Meanwhile, the PC transmits to the scanner the instruction to cancel blank-page elimination and the instruction to scan a double-sided document, and when receiving image data obtained by scanning document images of a plurality of double-sided documents with respect to each page and providing page numbers, the PC switches and displays front-side and back-side images based upon the received image data alternately in page-numerical order.

Thereby, in the case of the scanner scanning double-sided documents, even when blank-page elimination is to be performed from a standard point of view, the scanner in principle does not perform blank-page elimination on image data produced by scanning the double-sided documents upon receiving from the outside the instruction to scan a double-sided document. Therefore, at the time of the scanner scanning document images of double-sided documents, it is possible to instruct on/off of blank-page elimination to the scanner from the outside.

Further, a parameter indicating alternate switching-display of front-side images and back-side images based upon image data by the pc is received from the PC, and in the case of receiving the instruction to scan a double-sided document from the PC, when the received parameter indicates switching-display of the images, elimination of image data is prohibited. Therefore, in the case of scanning a plurality of double-sided documents with respect to each page with reception of the instruction to scan a double-sided document from the outside, blank-page elimination is not performed only when it is presumed that front-side and back-side images based upon image data should be alternately switched and displayed outside.

Although elimination of image data regarding a page determined as being a blank page is in principle prohibited in the case of receiving the instruction to cancel blank-page elimination or the instruction to scan a double-sided document from the PC 1 in the first embodiment, this is not restrictive, and determining whether or not each page is a blank page may be prohibited so as not to make image data eliminated. In this case, the processing order for steps S114 and S115 of FIG. 3B may be reversed, so that whether or not the page is a blank page is not determined when the blank-page elimination flag is set to "1".

Further, although the display section 13 of the PC 1 alternately switches and displays front-side and back-side images based upon image data obtained by the scanner 4 scanning double-sided documents, this is not restrictive, and the display section 43 of the scanner 4 may alternately switch and display front-side and back-side images based upon the image data. In this case, when it is determined in step S102 of FIG. 3A that the instruction to scan a double-sided document given from the operating section 44 or the application program has been issued (S102: YES), the processing proceeds to step S107. However, it is assumed that the parameter indicating alternate switching-display of front-side and back-side images is given from the operating section 44 or the application program.

Second Embodiment

The first embodiment is configured such that the scanner 4 has a blank-page eliminating function and the function is eliminated from the PC 1 for example when the instruction to scan a double-sided document is received, whereas a second embodiment is configured such that in the case of the blank-page elimination function of the scanner being not eliminable from the outside, image data of a blank page is inserted on the PC side when the PC receives image data subjected to blank-page elimination.

Figure 4:
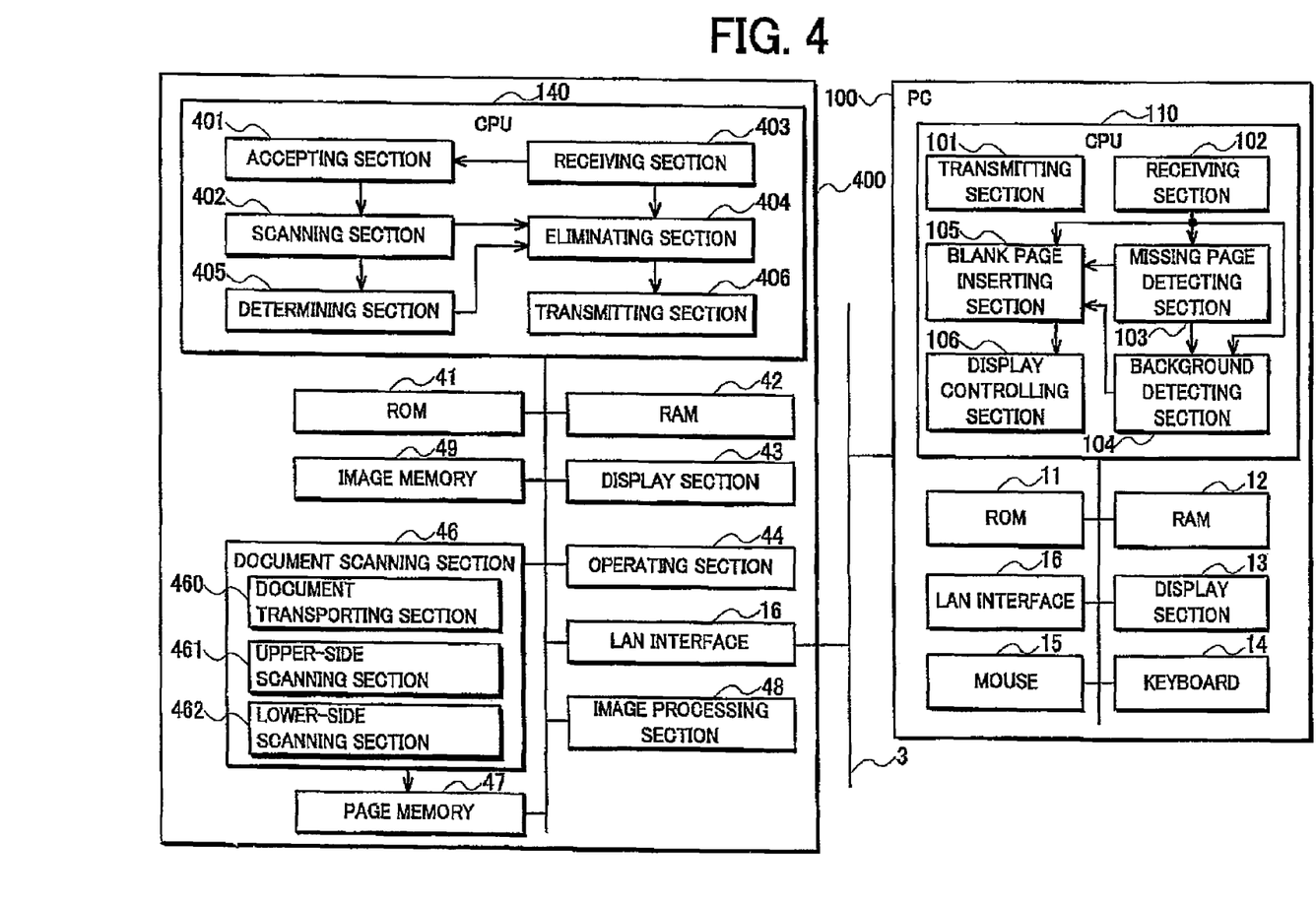
FIG. 4 is a block diagram illustrating a configuration of a network scanner system equipped with a scanner and a PC according to a second embodiment of the present invention.

FIG. 4 is a block diagram of a network scanner system equipped with a scanner and a PC according to the second embodiment of the present invention. The network scanner system according to the second embodiment is made up of a scanner (image scanning device) 400, and a PC 100 connected to the scanner 400 through the LAN 3.

The PC 100 includes a CPU 110 as a control center. The CPU 110 is bus-connected with the ROM 11 and the RAM 12. The ROM 11 stores information such as a program. The RAM 12 stores temporarily generated information. Other blocks bus-connected to the CPU 110 are similar to those bus-connected to the CPU 10 in the first embodiment, and detailed descriptions thereof are thus omitted.

Each functional block of the CPU 110 is realized by software. The transmitting section 101 transmits the instruction to scan a double-sided document to the scanner 400 through the LAN 3. The receiving section 102 receives and acquires image data from the scanner 400 through the LAN 3, and gives the acquired image data to a missing page detecting section 103, a background detecting section 104 and a blank page inserting section (inserting section) 105. The missing page detecting section 103 detects a missing page number from the continuity or discontinuity of page numbers each embedded into a header of each page of the image data given from the receiving section 102 and gives the detected result to the background detecting section 104 and the blank page inserting section 105.

The background detecting section 104 detects a background of a document based upon image data received one page before (or one page after) the missing page number given from the missing page detecting section 103, and gives the detected background to the blank page inserting section 105. Specifically, when an even (or odd) page number is missing in a case where a document having a blank page as its back-side is scanned as a double-sided document and subjected to blank-page elimination, a background of a document is determined on the assumption that an odd page one page before (or an even page one page after) the missing page corresponds to the front side (or back side) of the same document.

The blank page inserting section 105 inserts, regarding the page number given from the missing page detecting section 103, image data of a solid-colored blank page of the same color as the background detected by the background detecting section 104 into the image data given from the receiving section 102, along with the page number. The display controlling section 106 produces a plurality of sets of front-side and back-side images reduced in image size from the document images based upon the image data given from the blank page inserting section 105, and displays each set of both images produced in page-numerical order inside a plurality of display areas previously set on the screen.

The scanner 400 includes a CPU 140 as a control center. The CPU 140 is bus-connected with the ROM 41 and the RAM 42. The ROM 41 stores information such as a program. The RAM 42 stores temporarily generated information. Other blocks bus-connected to the CPU 140 are similar to those bus-connected to the CPU 40 in the first embodiment, and detailed descriptions thereof are thus omitted.

Each functional block of the CPU 140 is realized by software. Functional blocks that exert different functions from those of the respective functional blocks of the CPU 40 in the first embodiment are described. The receiving section 403 receives the instruction to scan a double-sided document from the PC 100 through the LAN 3, and gives that instruction to the accepting section 401. The eliminating section 404 unconditionally eliminates image data in accordance with a page specified by information given from the determining section 405, from the image data given from the scanning section 402, and gives the obtained data to the transmitting section 406. Other functional blocks are similar to those in the first embodiment, and detailed descriptions thereof are thus omitted.

In the foregoing configuration, for example, when the instruction to scan a double-sided document given from the operating section 44 is accepted or when the instruction to scan a double-sided document transmitted from the PC 100 is received after placement of a plurality of double-sided documents in the document tray of the scanner 400, the scanner 400 scans front- and back-sides of each double-sided document to produce image data. Although the second embodiment is similar to the first embodiment in storing of the produced image data in the image memory 49, it is different from the first embodiment in constant elimination of a blank page.

Thereafter, when image data for all pages is transmitted to the PC 100 and stored in the image memory of the PC 100, the PC 100 inserts image data of the page subjected to blank-page elimination into the received image data, along with the page number. The PC 100 then produces a plurality of sets of front-side and back-side images reduced in image size from document images, and each set of both images produced is displayed in page-numerical order on the LCD of the display section 13.

Operations performed by the scanner 400 and the PC 100 according to the second embodiment of the present invention are described with reference to flowcharts FIGS. 5A and 5B, which are flowcharts each illustrating a procedure for the CPUs 140, 110 in the case of the PC 100 inserting a blank page into image data obtained by the scanner 400 scanning double-sided documents and performing blank-page elimination. The following processing are respectively executed by the CPU 140 of the scanner 400 and the CPU 110 of the PC 100 in accordance with control programs previously stored in the ROM 41 of the scanner 400 and the ROM 11 of the PC 100. The CPU 140 of the scanner 400 starts the following processing when double-sided documents are placed in the document tray, and preparation for scanning is thus completed. The CPU 110 of the PC 100 starts the following processing when becoming able to accept an instruction in accordance with scanning of a document given from an application program.

Figure 5A:
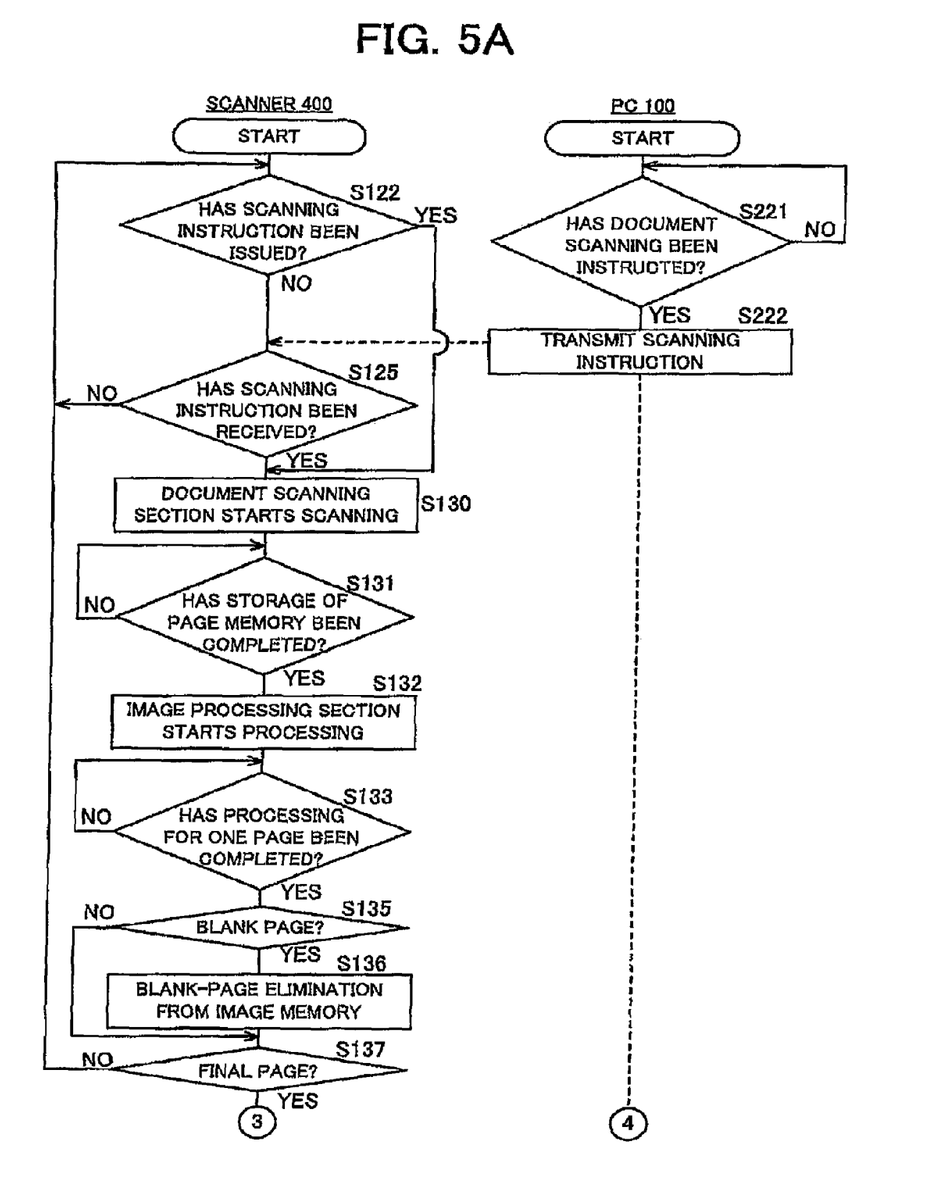
FIG. 5A is a flowcharts illustrating a procedure for a CPU in the case of the PC inserting a blank page into image data obtained by the scanner scanning double-sided documents and performing blank-page elimination.
Figure 5B:
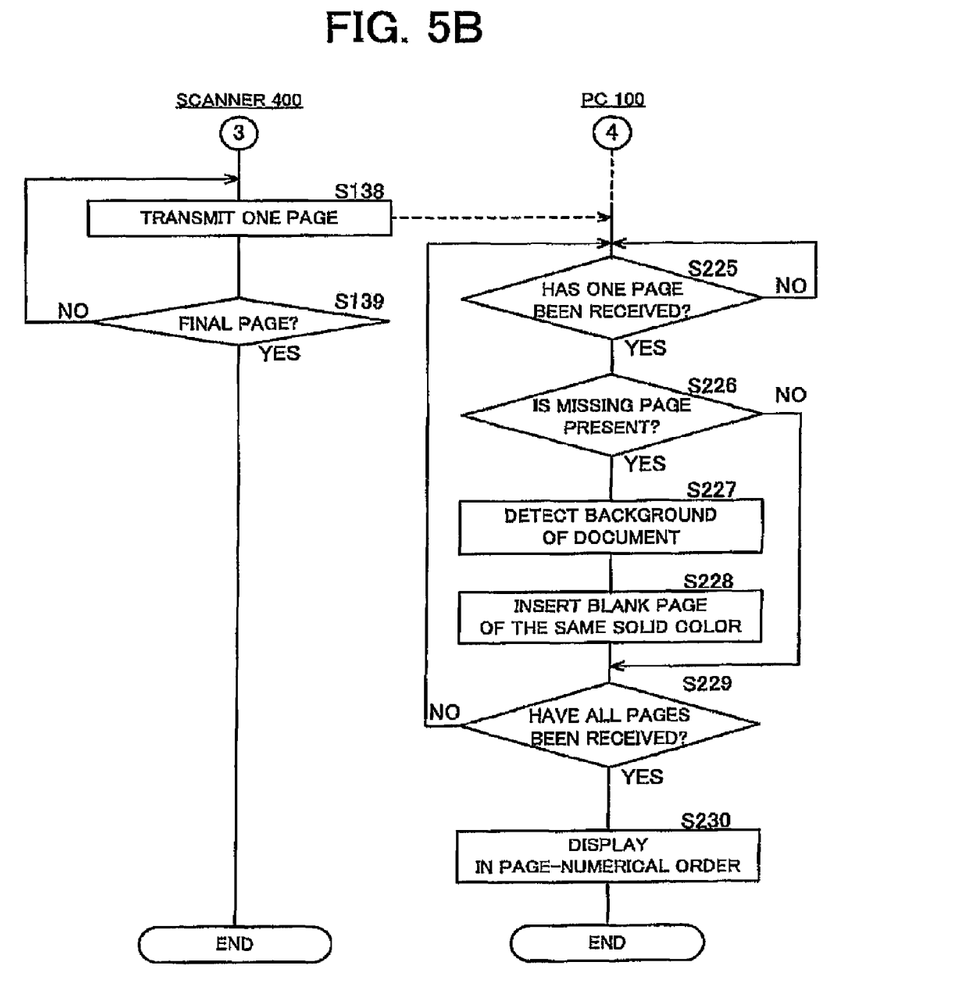
FIG. 5B is a flowcharts illustrating a procedure for the CPU in the case of the PC inserting a blank page into the image data obtained by the scanner scanning double-sided documents and performing blank-page elimination.

When the processing of FIG. 5A is started, the CPU 140 of the scanner 400 determines whether or not the instruction to scan a double-sided document that is given from the operating section 44 or the application program has been issued (S122). When the scanning instruction has not been issued (S122: NO), the CPU 140 determines whether or not a scanning instruction has been received from the PC 100 (S125). When the scanning instruction has not been received (S125: NO), the CPU 140 returns the processing to step S122. In this manner, the CPU 140 of the scanner 400 repeatedly executes the processing from steps S122 to S125 until receiving the scanning instruction from the operating section 44 or the application program, or receiving the scanning instruction from the PC 100.

When the scanning instruction has been received from the PC 100 (S125: YES) or when the scanning instruction has been issued from the operating section 44 or the application program (S122: YES), the CPU 140 makes the document scanning section 46 start scanning of documents (S130). Thereafter, the CPU 140 determines whether or not the page memory 47 has completed storing data for one page (S131). When the storing has not been completed (S131: NO), the CPU 140 stands by until the page memory 47 completes the storing. When the page memory 47 has completed the storing (S131: YES), the CPU 140 makes the image processing section 48 start performing predetermined image processing (S132).

The CPU 140 then determines whether or not the image processing section 48 has completed image processing on data for one page (S133). When the processing has not been completed (S133: NO), the CPU 140 stands by until the image processing section 48 completes the image processing. When the processing has been completed (S133: YES), the CPU 140 determines whether or not a page on which the image processing has been completed is a blank page (S135). When the page is a blank page (S135: YES), the CPU 140 eliminates image data of the page determined as being a blank page from the image memory 49, to perform blank-page elimination (S136). In this case, a page number of the page subjected to blank-page elimination is taken as an unused number.

When completing the processing of step S136 or when the page is not a blank page (S135: NO), the CPU 140 determines whether or not the page on which the image processing has been completed is a final page (S137). When the page is not a final page (S137: NO), namely when image data for all pages has not been stored in the image memory 49, the CPU 140 returns the processing to step S122.

When the page on which the image processing has been completed is a final page (S137: YES), the CPU 140 transmits image data for one page from the image memory 49 (S138), and determines whether or not the transmitted page is a final page (S139). When the page is not a final page (S139: NO), the CPU 140 returns the processing to step S138. When the page is a final page (S139: YES), the CPU 140 completes the processing.

Meanwhile, the CPU 110 of the PC 100 determines whether or not the instruction to scan a document has been given from the application program (S221). When the instruction has not been given (S221: NO), the CPU 110 stands by until being given the instruction to scan a document. When the instruction to scan a document has been given (S221: YES), the CPU 110 transmits the scanning instruction to the scanner 400 (S222).

The CPU 110 then determines whether or not image data for one page has been received from the scanner 400 (S225), and stands by until receiving the data (S225: NO). When image data for one page has been received (S225: YES), the CPU 110 scans a page number embedded into a header of the received image data, and determines whether or not a missing page is present from the continuity or discontinuity of page numbers (S226). When a missing page is present (S226: YES), the CPU 110 detects a background of a document based upon image data received one page before the missing page number (S227), and inserts image data of a solid-colored blank page of the same color as the detected background into a series of image data (S228). In this case, a header of the inserted image data is added with a page number.

When completing the processing of step S228 or when a missing page is not present (S226: NO), the CPU 110 determines whether or not image data for all pages has been received (S229). When image data for all pages has not been received (S229: NO), the CPU 110 returns the processing to step S225. When image data for all pages has been received (S229: YES), as illustrated in FIG. 2, the CPU 110 alternately switches and displays the front-side and back-side images of each document based upon the received image data in page-numerical order (S230), to complete the processing.

Features corresponding to those in the first embodiment are provided with the same numerals, and detailed descriptions thereof are omitted.

As thus described, according to the second embodiment, the PC receives image data, obtained by the scanner scanning document images of a plurality of double-sided documents and providing page numbers. Next, the PC detects a page number missing from page numbers to be sequentially provided to the received image data. The PC then inserts a solid-colored image into the received image data correspondingly to the detected page number. The PC then switches and displays front-side and back-side images based upon the image data with the solid-colored image inserted therein, alternately in page-numerical order on the screen. Meanwhile, the scanner scans document images of a plurality of double-sided documents to produce image data, determines whether or not a page containing an image based upon the produced image data is a blank page (solid colored), eliminates image data in accordance with a page determined as being a blank page from the produced image data, and transmits the produced image data other than the eliminated image data to the PC.

Thereby, when acquiring image data obtained by the scanner scanning document images of double-sided documents and detecting a page subjected to blank-page elimination, the PC inserts a blank-page image corresponding to the detected blank page into the acquired image data. Therefore, at the time of acquiring image data obtained by scanning document images of double-sided documents, the PC can insert an image of a page subjected to blank-page elimination.

Moreover, the PC detects a background regarding a document that contains a page having a page number missing from image data, and inserts image data for one page of the same color as the detected background into the image data received from the scanner. Therefore, when an image based upon the image data acquired by the PC is displayed, the front and back sides of the displayed image have the same colored background.

Although a missing number is detected only from page numbers to be sequentially provided on received image data on the premise of image data received by the PC 100 from the scanner 400 being one obtained by scanning document images of double-sided documents in the second embodiment, this is not restrictive. For example, a missing number may be detected only when the whole of image data received by the PC 100 has an attribute of a double-sided document. Further, for example, information other than the page number indicating to which of the front or back sides of the document each page corresponds may be previously added to the header of each page, and the PC 100 may detect a missing page number based upon the information and page numbers.

Further, although the PC 100 detects missing of a page number on one page at a time on the premise that page-unit blocks are received in page-numerical order, if there is a possibility of receiving the blocks in order different from the page-numerical order, missing of a page number may be detected after reception of data for all pages.

The present invention may be obtained by recording the foregoing image scanning method for scanning document images of double-sided documents to produce image data and the foregoing image display controlling method for acquiring image data to control image display in a non-transitory computer readable record medium recorded with program codes (execution form program, intermediate code program, source program) to be executed by the computer. Thereby, it is possible to portably provide a record medium recorded with a program for performing the above methods.

The record medium may be, for example, a program medium such as a ROM, or a program medium that can be read by inserting the record medium into a program reader provided as an external storage device. In either case, a stored program code may be configured to be accessed by the CPU so as to be executed, or may be configured to be read, or downloaded into a program storage area of a RAM, so as to be executed. It is assumed that the program for downloading is previously stored into a body device.

The program media may also be a medium with a program code supported in a mobile manner so that the program code is downloadable from communication networks including the Internet. In the case of downloading a program code from communication networks, the program for downloading may be previously stored into the body device, or may be installed from another record medium. The present invention can also be realized in the form of a computer data signal in which the program code is embedded into a carrier wave and electrically transmitted.

The record medium is read, for example, by a program reader provided in a digital multifunction peripheral and a computer system, and the foregoing image scanning and image display controlling methods are executed by CPUs. The computer system is made up of: an image input device such as a flat bed scanner, a film scanner or a digital camera; a computer into which a predetermined program is loaded so as to perform a variety of processing such as the foregoing image scanning and image display controlling methods; an image display device such as a CRT display and a liquid crystal display that displays a result of processing performed by the computer; and a printer that outputs the result of the processing performed by the computer to paper or the like. A communication means, such as a network card and a modem, for connection to a server and the like through the network, is further provided.

While the present invention has been described with respect to embodiments thereof, it will be apparent to those skilled in the art that the disclosed invention may be modified in numerous ways and may assume many embodiments other than those specifically set out and described above. Accordingly, the appended claims cover all modifications that fall within the true spirit and scope of the present invention.

What is claimed is:

1. An image scanning device, comprising:
an accepting section for accepting an instruction to scan a double-sided document;
a scanning section for scanning a plurality of double-sided documents with respect to each page to produce image data in the case of the accepting section accepting the scanning instruction;
a determining section for determining whether or not each page of the documents is solid colored based upon the image data produced by the scanning section;
an eliminating section for eliminating image data in accordance with a page determined by the determining section as being solid colored from the image data produced by the scanning section;
a transmitting section for transmitting, to an outside, image data other than the image data eliminated by the eliminating section among the image data produced by the scanning section; and
a receiving section for receiving from the outside an instruction to scan a double-sided document, wherein
the accepting section is set so as to accept the scanning instruction received by the receiving section, and
the eliminating section is prohibited from eliminating image data when the accepting section accepts the scanning instruction received by the receiving section,
wherein the receiving section is set so as to receive, from the outside, information indicating whether or not front-side images and back-side images based upon image data should be alternately switched and displayed outside, and the eliminating section is prohibited from eliminating image data when the information received by the receiving section indicates that the switching-display should be performed in the case of the accepting section accepting the scanning instruction received by the receiving section.

2. An image scanning method, comprising:

accepting an instruction to scan a double-sided document;

scanning a plurality of double-sided documents with respect to each page to produce image data in the case of accepting the scanning instruction;

determining whether or not each page of the documents is solid colored based upon the produced image data;

eliminating image data in accordance with a page determined as being solid colored from the produced image data;

transmitting, to an outside, image data other than the eliminated image data among the produced image data;

receiving from the outside an instruction to scan a double-sided document; and prohibiting elimination of image data in the case of accepting the received scanning instruction;

wherein information that indicates whether or not front-side images and back-side images based upon image data should be alternately switched and displayed outside, is received from the outside, and elimination of image data is prohibited when the information received indicates that the switching-display should be performed in the case of accepting the received scanning instruction.

3. A computer program recorded in a non-transitory record medium that makes a computer execute the steps of:

determining whether or not each page of a plurality of double-sided documents is solid colored based upon image data produced by scanning the documents with respect to each page;

eliminating image data in accordance with a page determined as being solid colored from the produced image data;

transmitting image data other than the eliminated image data among the produced image data to the computer;

receiving an instruction to scan a double-sided document from an outside;

accepting the received scanning instruction; and prohibiting elimination of image data in the case of accepting the received scanning instruction;

wherein information that indicates whether or not front-side images and back-side images based upon image data should be alternately switched and displayed outside is received from the outside, and elimination of image data is prohibited when the information received indicates that the switching-display should be performed in the case of accepting the received scanning instruction.

4. An image processing system, comprising:

an image scanning device and an image display controlling device, wherein the image scanning device has:

an accepting section for accepting an instruction to scan a double-sided document;

a scanning section for scanning document images of a plurality of double-sided documents with respect to each page to produce image data provided with page numbers in the case of the accepting section accepting the scanning instruction;

a determining section for determining whether or not each page of the documents is solid colored based upon the image data produced by the scanning section;

an eliminating section for eliminating image data in accordance with a page determined by the determining section as being solid colored from the image data produced by the scanning section;

a first transmitting section for transmitting, to an outside, image data other than the image data eliminated by the eliminating section among the image data produced by the scanning section; and a first receiving section for receiving from the outside an instruction to scan a double-sided document, the accepting section is set so as to accept the scanning instruction received by the receiving section, the eliminating section is prohibited from eliminating image data when the accepting section accepts the scanning instruction received by the receiving section, and the image display controlling device has:

a second transmitting section for transmitting the scanning instruction;

a second receiving section for receiving image data obtained by scanning document images of a plurality of double-sided documents with respect to each page and providing page numbers; and a display controlling section for switching and displaying front-side images and back-side images based upon the received image data alternately in page-numerical order.

5. The image processing system according to claim 4, wherein the first receiving section is set so as to receive, from the image display controlling device, information indicating whether or not front-side images and back-side images based upon image data should be alternately switched and displayed in the image display controlling device, and the eliminating section is prohibited from eliminating image data when the information received by the first receiving section indicates that the switching-display should be performed in the case of the accepting section accepting the scanning instruction received by the first receiving section.

6. An image display controlling device, comprising:

a central processing unit comprising:

a receiving section for receiving image data obtained by scanning document images of a plurality of double-sided documents and providing page numbers;

an eliminated page detecting section for detecting an eliminated page and corresponding page order based on non-solid colored image data from among the received image data;

an inserting section for inserting a solid-colored image into the received image data on the basis of the detected eliminated page order; and a display controlling section for switching and displaying front-side images and back-side images based upon the image data with the solid-colored image inserted therein, alternately in page-numerical order on a screen.

7. The image display controlling device according to claim 6, further comprising:

a background detecting section for detecting a background of the document based upon the received image data, wherein the inserting section inserts image data for one page of the same color as the background detected by the background detecting section regarding the document that contains a page having the page number detected by the missing page detecting section.

8. An image display controlling method, comprising executing by central processing unit steps comprising:
- receiving image data obtained by scanning document images of a plurality of double-sided documents and providing page numbers;
- detecting an eliminated page and corresponding page order based on non-solid colored image data from among the received image data;
- inserting a solid-colored image into the received image data on the basis of the detected eliminated page order; and
- switching and displaying front-side images and back-side images based upon the image data with the solid-colored image inserted therein, alternately in page-numerical order on a screen.

9. The image display controlling method according to claim 8, further comprising:
- detecting a background of the document based upon the received image data, wherein
- image data for one page of the same color as the detected background regarding the document that contains a page having the detected missing page number is inserted.

10. A computer program recorded on a non-transitory record medium that makes a computer execute the steps of:
- detecting an eliminated page and corresponding page order based on non-solid colored image data from among the acquired image data;
- inserting solid-colored image data for one page into the acquired image data on the basis of the detected eliminated page order; and
- alternately switching and displaying front-side images and back-side images based upon the image data with the solid-colored image inserted therein, in page-numerical order on a screen.

11. The computer program according to claim 10, wherein the computer is further made to execute the steps of:
- detecting a background of the document based upon the received image data, wherein
- image data for one page of the same color as the detected background regarding the document that contains a page having the detected missing page number is inserted.

12. An image processing system, including:
- an image scanning device and an image display controlling device, wherein
- the image scanning device has:
  - a scanning section for scanning document images of a plurality of double-sided documents to produce image data provided with page numbers;
  - a determining section for determining whether or not a page containing an image based upon the image data produced by the scanning section is solid colored;
  - an eliminating section for eliminating image data in accordance with a page determined by the determining section as being solid colored from the image data produced by the scanning section; and
  - a transmitting section for transmitting, to an outside, image data other than the image data eliminated by the eliminating section among the image data produced by the scanning section, and
- the image display controlling device has:
  - a receiving section for receiving image data obtained by scanning document images of a plurality of double-sided documents and providing page numbers;
  - an eliminated page detecting section for detecting a an eliminated page and corresponding page order based on non-solid colored image data from among the received image data;
  - an inserting section for inserting solid-colored image data for one page into the received image data on the basis of the detected eliminated page order; and
  - a display controlling section for switching and displaying front-side images and back-side images based upon the image data with the solid-colored image inserted therein, alternately in page-numerical order on a screen.

13. The image processing system according to claim 12, wherein
- the image display controlling device further includes a background detecting section for detecting a background of the document based upon the received image data, and
- the inserting section inserts image data for one page of the same color as the background detected by the background detecting section regarding the document that contains a page having the page number detected by the missing page detecting section.

14. The image display controlling device according to claim 6, wherein the missing page section detects a page number missing from page numbers by:
- scanning a page number embedded into a header of the received image data; and
- determining whether a missing page number is present from continuity or discontinuity of page numbers.

15. The image display controlling method according to claim 8, wherein a page number missing from page numbers is detected by:
- scanning a page number embedded into a header of the received image data; and
- determining whether a missing page number is present from continuity or discontinuity of page numbers.

16. The computer program according to claim 10, wherein a page number missing from page numbers is detected by:
- scanning a page number embedded into a header of the received image data; and
- determining whether a missing page number is present from continuity or discontinuity of page numbers.

* * * * *